United States Patent
Guo et al.

(10) Patent No.: US 11,889,308 B2
(45) Date of Patent: Jan. 30, 2024

(54) MULTI-ACCESS EDGE COMPUTING (MEC)-KEY ID DERIVATION IN AUTHENTICATION BETWEEN UE AND EDGE SERVERS

(71) Applicant: APPLE INC., Cupertino, CA (US)

(72) Inventors: Shu Guo, Beijing (CN); Dawei Zhang, Cupertino, CA (US); Fangli Xu, Beijing (CN); Haijing Hu, Cupertino (CN); Huarui Liang, Beijing (CN); Mona Agnel, Greater London (GB); Ralf Rossbach, Bavaria-Bayern (DE); Sudeep Manithara Vamanan, Bavaria-Bayern (DE); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 352 days.

(21) Appl. No.: 17/593,306

(22) PCT Filed: May 10, 2021

(86) PCT No.: PCT/CN2021/092830
§ 371 (c)(1),
(2) Date: Sep. 15, 2021

(87) PCT Pub. No.: WO2022/236596
PCT Pub. Date: Nov. 17, 2022

(65) Prior Publication Data
US 2023/0247426 A1    Aug. 3, 2023

(51) Int. Cl.
*H04W 12/069* (2021.01)
*H04W 12/72* (2021.01)
*H04W 12/041* (2021.01)

(52) U.S. Cl.
CPC ....... *H04W 12/069* (2021.01); *H04W 12/041* (2021.01); *H04W 12/72* (2021.01)

(58) Field of Classification Search
CPC .. H04W 12/069; H04W 12/72; H04W 12/041
(Continued)

(56) References Cited

U.S. PATENT DOCUMENTS 11,683,323 B2 * 6/2023 Kneib ............... H04L 63/08
726/6
2008/0155659 A1 * 6/2008 Gazier ............ H04L 63/0884
726/8
(Continued)

FOREIGN PATENT DOCUMENTS

CN    116569576 A  *  8/2023
EP    4255092 A1  * 10/2023  ........... H04W 76/12
(Continued)

OTHER PUBLICATIONS

Cui et al., "Edge-Intelligence-Empowered, Unified Authentication and Trust Evaluation for Heterogeneous Beyond 5G Systems," in IEEE Wireless Communications, vol. 28, No. 2, pp. 78-85, Apr. 2021, doi: 10.1109/MWC.001.2000325. (Year: 2021).*
(Continued)

*Primary Examiner* — Peter C Shaw
(74) *Attorney, Agent, or Firm* — Dorsey & Whitney LLP (57) ABSTRACT

Disclosed are embodiments for authentication and authorization in a 5G network between an edge enabler client (EEC) of a UE and an edge configuration server (ECS). The embodiment include performing primary authentication with the 5G network to obtain a $K_{AUSF}$; generating a $K_{edge}$ and a $K_{edge}$ ID using the $K_{AUSF}$ and a subscription permanent identifier (SUPI); providing the $K_{edge}$ and the $K_{edge}$ ID to the EEC to cause it to compute a $MAC_{EEC}$ using the $K_{edge}$ and an EEC ID; and sending to the ECS an application registration request, the application registration request including the EEC ID, MACEEC, and $K_{edge}$ ID.

16 Claims, 9 Drawing Sheets

(58) Field of Classification Search
USPC .......................................................... 726/6
See application file for complete search history.

(56) References Cited

U.S. PATENT DOCUMENTS

| | | | |
|---|---|---|---|
| 2010/0017867 A1* | 1/2010 | Fascenda ............ | H04W 12/069 726/2 |
| 2013/0014238 A1* | 1/2013 | See ..................... | H04L 63/08 726/6 |
| 2014/0006783 A1* | 1/2014 | Zhang ................. | H04L 63/0428 713/168 |
| 2014/0115678 A1* | 4/2014 | Thodupunoori ........ | H04L 67/53 726/6 |
| 2020/0359218 A1* | 11/2020 | Lee ...................... | H04M 15/50 |
| 2021/0112137 A1 | 4/2021 | Soloway et al. | |
| 2022/0225084 A1* | 7/2022 | Rajput ................ | H04W 12/009 |
| 2022/0408445 A1* | 12/2022 | Sun ..................... | H04W 72/54 |
| 2023/0100395 A1* | 3/2023 | Yadav .................. | H04W 12/08 370/392 |
| 2023/0247426 A1* | 8/2023 | Guo .................... | H04W 12/069 726/6 |

FOREIGN PATENT DOCUMENTS

| | | | | |
|---|---|---|---|---|
| WO | 2020226454 A1 | 11/2020 | | |
| WO | WO-2022060263 A1 * | 3/2022 | ......... | G01S 5/02213 |
| WO | WO-2022152367 A1 * | 7/2022 | | |

OTHER PUBLICATIONS

Lee et al., "A Multi-Server Authentication Protocol Achieving Privacy Protection and Traceability for 5G Mobile Edge Computing," 2021 IEEE International Conference on Consumer Electronics (ICCE), Las Vegas, NV, USA, 2021, pp. 1-4, doi: 10.1109/ICCE50685.2021.9427680. (Year: 2021).*

Lee2 et al., "Secure and Anonymous Authentication Scheme for Mobile Edge Computing Environments," in IEEE Internet of Things Journal, doi: 10.1109/JIOT.2023.3308568. (Year: 2023).*

Han et al., "Context-Awareness Enhances 5G Multi-Access Edge Computing Reliability," in IEEE Access, vol. 7, p. 21290-21299, 2019, doi: 10.1109/ACCESS.2019.2898316. (Year: 2019).*

3GPP TR 33.839, "3rd Generation Partnership Project; Technical Specification Group Services and System Aspects; Study on Security Aspects of Enhancement of Support for Edge Computing in 5GC (Release 17)", V0.1.0, Aug. 2020, 24 pages.

Apple, "Addressing the EN in solution#2", S3-203012, 3GPP TSG-SA3 Meeting #101-e. e-Meeting, Agenda Item 5.8, Nov. 9-20, 2020, 4 pages.

Huawei, Hisilicon, "EC: Framework on the EEC authentication and authorization.", S3-203067 (Revision S3-20xxxx), 3GPP TSG-SA3 Meeting #101e, e-Meeting, Agenda Item 5.8, Nov. 9-20, 2020, 3 pages.

PCT/CN2021/092830, International Search Report and Written Opinion, dated Feb. 11, 2022, 9 pages.

* cited by examiner

MULTI-ACCESS EDGE COMPUTING (MEC)-KEY ID DERIVATION IN AUTHENTICATION BETWEEN UE AND EDGE SERVERS

TECHNICAL FIELD

This application relates generally to wireless communication systems, including key ID derivation in authentication.

BACKGROUND OF THE DISCLOSURE

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Figure 1:
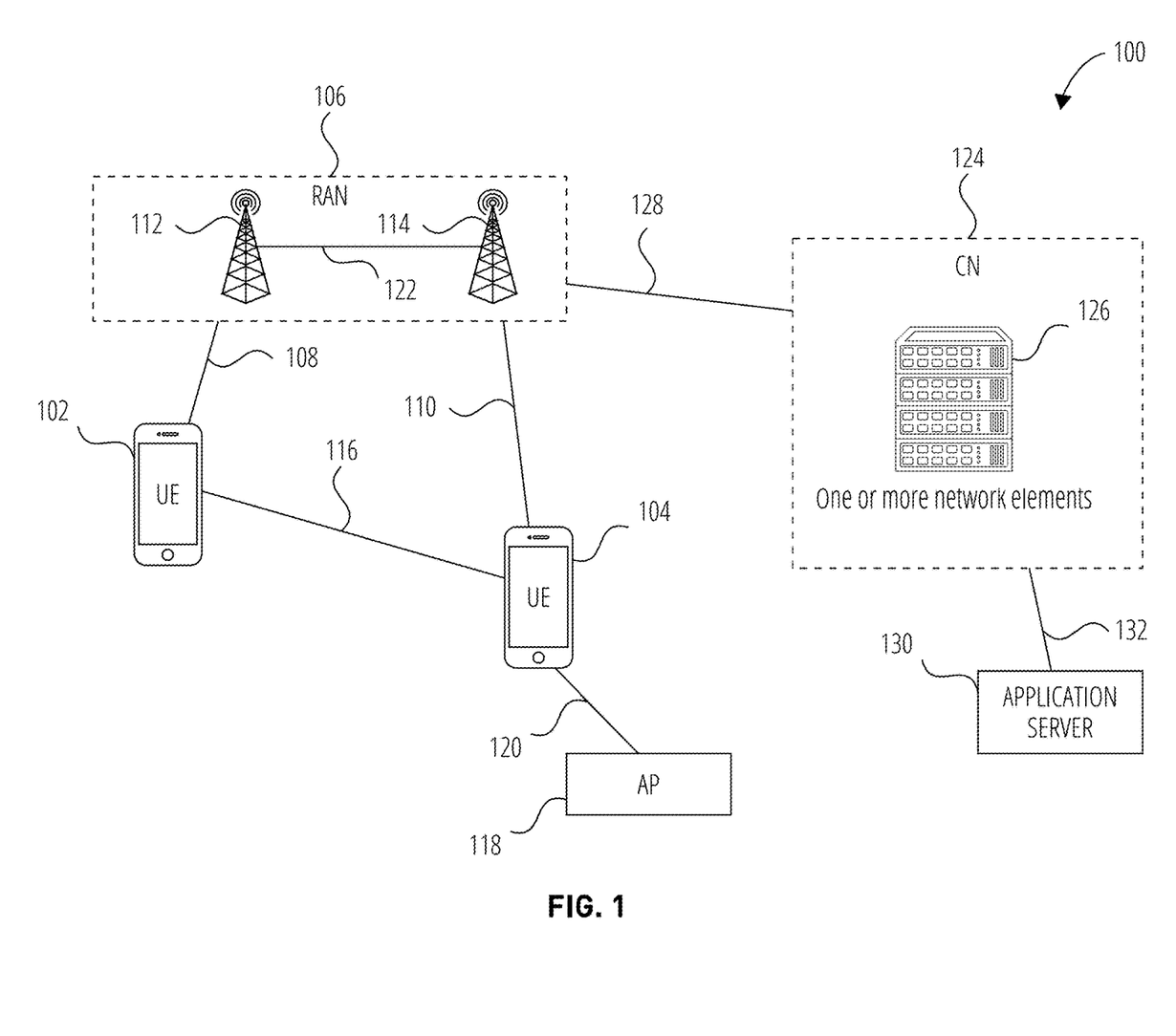
FIG. 1 illustrates an example architecture of a wireless communication system, according to embodiments disclosed herein.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, wireless communication system 100 includes UE 102 and UE 104 (although any number of UEs may be used). In this example, UE 102 and UE 104 are illustrated as smartphones (e.g., handheld touchscreen mobile computing devices connectable to one or more cellular networks), but may also comprise any mobile or non-mobile computing device configured for wireless communication.

UE 102 and UE 104 may be configured to communicatively couple with a RAN 106. In embodiments, RAN 106 may be NG-RAN, E-UTRAN, etc. UE 102 and UE 104 utilize connections (or channels) (shown as connection 108 and connection 110, respectively) with RAN 106, each of which comprises a physical communications interface. RAN 106 can include one or more base stations, such as base station 112 and base station 114, that enable connection 108 and connection 110.

In this example, connection 108 and connection 110 are air interfaces to enable such communicative coupling, and may be consistent with RAT(s) used by RAN 106, such as, for example, an LTE and/or NR.

In some embodiments, UE 102 and UE 104 may also directly exchange communication data via a sidelink interface 116. UE 104 is shown to be configured to access an access point (shown as AP 118) via connection 120. By way of example, connection 120 can comprise a local wireless connection, such as a connection consistent with any IEEE 802.11 protocol, wherein AP 118 may comprise a Wi-Fi® router. In this example, AP 118 may be connected to another network (for example, the Internet) without going through a CN 124.

In embodiments, UE 102 and UE 104 can be configured to communicate using orthogonal frequency division multiplexing (OFDM) communication signals with each other or with base station 112 and/or base station 114 over a multi-carrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of base station 112 or base station 114 may be implemented as one or more software entities running on server computers as part of a virtual network. In addition, or in other embodiments, base station 112 or base station 114 may be configured to communicate with one another via interface 122. In embodiments where wireless communication system 100 is an LTE system (e.g., when CN 124 is an EPC), interface 122 may be an X2 interface. The X2 interface may be defined between two or more base stations (e.g., two or more eNBs and the like) that connect to an EPC, and/or between two eNBs connecting to the EPC. In embodiments where wireless communication system 100 is an NR system (e.g., when CN 124 is a 5GC), interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

RAN 106 is shown to be communicatively coupled to CN 124. CN 124 may comprise one or more network elements 126, which are configured to offer various data and telecommunications services to customers/subscribers (e.g., users of UE 102 and UE 104) who are connected to CN 124 via RAN 106. The components of CN 124 may be implemented in one physical device or separate physical devices including components to read and execute instructions from a machine-readable or computer-readable medium (e.g., a non-transitory machine-readable storage medium).

In embodiments, CN 124 may be an EPC, and RAN 106 may be connected with CN 124 via an S1 interface 128. In embodiments, S1 interface 128 may be split into two parts, an S1 user plane (S1-U) interface, which carries traffic data between base station 112 or base station 114 and a serving gateway (S-GW), and the S1-MME interface, which is a signaling interface between base station 112 or base station 114 and mobility management entities (MMEs).

In embodiments, CN 124 may be a 5GC, and RAN 106 may be connected with CN 124 via an NG interface 128. In embodiments, NG interface 128 may be split into two parts, an NG user plane (NG-U) interface, which carries traffic data between base station 112 or base station 114 and a user plane function (UPF), and S1 control plane (NG-C) interface, which is a signaling interface between base station 112 or base station 114 and access and mobility management functions (AMFs).

Generally, an application server 130 may be an element offering applications that use internet protocol (IP) bearer resources with CN 124 (e.g., packet switched data services). Application server 130 can also be configured to support one or more communication services (e.g., VoIP sessions, group communication sessions, etc.) for UE 102 and UE 104 via CN 124. Application server 130 may communicate with CN 124 through an IP communications interface 132.

Authentication and key agreement (AKA) procedures involve mutual authentication between a UE and the network to derive cryptographic keys that protect user-plane and control-plane data. Each 3G, 4G, and 5G generation defines some authentication method to allow authorized users to access network and reject unauthorized users. The 3GPP standards define evolved packet system-AKA (EPS-AKA) for 4G LTE systems. Similarly, the following three authentication methods are defined for 5G systems: 5G-AKA (5G-AKA); extensible authentication protocol-AKA (EAP-AKA'); and extensible authentication protocol—transport layer security (EAP-TLS).

Figure 2:
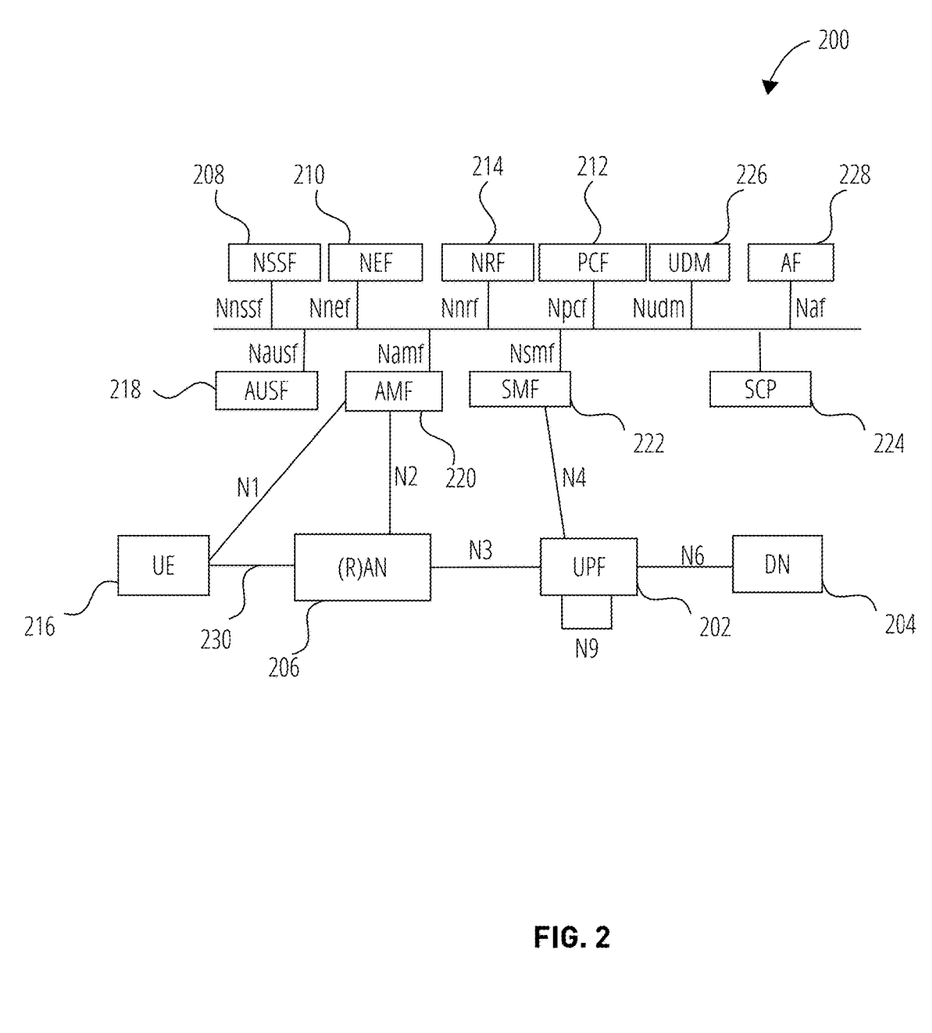
FIG. 2 illustrates an example service based architecture in accordance with certain embodiments.

FIG. 2 illustrates a service based architecture 200 in a 5G system, according to one embodiment. 3GPP has proposed service based architecture 200 for core network with new network entities and new services to support a unified authentication framework. This framework makes the 5G-AKA procedure suitable for both open and access-network agnostic using three authentication methods, 5G-AKA, EAP-AKA', and EAP-TLS. The framework allows multiple security contexts which can be established with one authentication execution, allowing the UE to move from a 3GPP access network to a non-3GPP network without having to be reauthenticated.

As described in 3GPP TS 23.501, service based architecture 200 comprises network functions such as an NSSF 208, a NEF 210, an NRF 214, a PCF 212, a UDM 226, an AUSF 218, an AMF 220, an SMF 222, for communication with a UE 216, a (R)AN 206, a UPF 202, and a DN 204. The NFs and NF services can communicate directly, referred to as Direct Communication, or indirectly via a SCP 224, referred to as Indirect Communication. FIG. 2 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 2 are described below.

NSSF 208 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

A network exposure function (NEF), e.g., NEF 210, supports exposure of capabilities and events. NF capabilities and events may be securely exposed by NEF 210 (e.g., for 3rd party, Application Functions, and/or Edge Computing). NEF 210 may store/retrieve information as structured data using a standardized interface (Nudr) to a UDR. NEF 210 may also secure provision of information from an external application to 3GPP network and may provide for the Application Functions to securely provide information to the 3GPP network (e.g., expected UE behavior, 5GLAN group information, and service specific information), wherein NEF 210 may authenticate and authorize and assist in throttling the Application Functions. NEF 210 may provide translation of internal-external information by translating between information exchanged with the AF and information exchanged with the internal network function. For example, NEF 210 translates between an AF-Service-Identifier and internal 5G Core information such as DNN and S-NSSAI. NEF 210 may handle masking of network and user sensitive information to external AF's according to the network policy. NEF 210 may receive information from other network functions (based on exposed capabilities of other network functions), and stores the received information as structured data using a standardized interface to a UDR. The stored information can be accessed and re-exposed by NEF 210 to other network functions and Application Functions, and used for other purposes such as analytics. For external exposure of services related to specific UE(s), NEF 210 may reside in the HPLMN. Depending on operator agreements, NEF 210 in the HPLMN may have interface(s) with NF(s) in the VPLMN. When a UE is capable of switching between EPC and 5GC, an SCEF+NEF may be used for service exposure.

NRF 214 supports service discovery function by receiving an NF Discovery Request from an NF instance or SCP and providing the information of the discovered NF instances to the NF instance or SCP. NRF 214 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

PCF 212 supports a unified policy framework to govern network behavior. PCF 212 provides policy rules to Control Plane function(s) to enforce them. PCF 212 accesses subscription information relevant for policy decisions in a Unified Data Repository (UDR). PCF 212 may access the UDR located in the same PLMN as the PCF.

UDM 226 supports generation of AKA Authentication Credentials, User Identification Handling (e.g., storage and management of subscription permanent identifier (SUPI) for each subscriber in the 5G system), de-concealment of a privacy-protected subscription concealed identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, UDM 226 uses subscription data (including authentication data) that may be stored in a UDR, in which case a UDM implements the application logic and may not require an internal user data storage and several different UDMs may serve the same user in different transactions. UDM 226 may be located in the HPLMN of the subscribers it serves, and may access the information of the UDR located in the same PLMN. UDM 226 may be similar to an HSS/HLR entity and hosts functions related to data management, such as the authentication credential repository and processing function (ARPF), which selects an authentication method based on subscriber identity and configured policy and computes the authentication data and keys for the authentication server function (AUSF) in some embodiments.

The subscription identifier de-concealing function (SIDF) decrypts a SUCI to obtain its long-term identity known as the SUPI, e.g., the IMSI. In 5G, a subscriber long-term identity is transmitted over the radio interfaces in an encrypted form. More specifically, a public key-based encryption is used to protect the SUPI. Therefore, only the SIDF has access to the private key associated with a public key distributed to UEs for encrypting their SUPIs.

AF 228 interacts with the Core Network to provide services that, for example, support the following: application influence on traffic routing; accessing NEF 210; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via NEF 210 to interact with relevant Network Functions.

AUSF 218 supports authentication for 3GPP access and untrusted non-3GPP access. AUSF 218 may also provide support for Network Slice-Specific Authentication and Authorization. It is within a home network and performs authentication with a UE. It makes the decision on UE authentication, and may uses a backend for computing the authentication data and keys when 5G-AKA or EAP-AKA' is used.

AMF 220 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, security anchor function (SEAF), Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of AMF 220. Regardless of the number of Network functions, in certain embodiments there is only one NAS interface instance per access network between the UE and the CN, terminated at one of the Network functions that implements at least NAS security and Mobility Management. AMF 220 may also include policy related functionalities. AMF 220 receives connection and session related information from the User Equipment (UE) (N1/N2) for handling connection and mobility management tasks.

The SEAF resides within serving network (closely with AMF) and acts as "middleman" during the authentication process between a UE and its home network. It can reject an authentication from the UE, but it relies on the UE's home network to accept the authentication.

A non-3GPP interworking Function (N3IWF) is an entity which acts as a VPN server to allow the UE to access the 5G core over untrusted, non-3GPP networks through IPsec tunnels. There can be multiple security contexts can be established with one authentication execution, allowing the UE to move from a 3GPP access network to a non-3GPP network without having to be reauthenticated.

In addition to the functionalities described above, AMF 220 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

SMF 222 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAB (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 222 may include policy related functionalities.

SCP 224 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, SCP 224 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

UE 216 may include a device with radio communication capabilities. For example, UE 216 may comprise a smartphone (e.g., handheld touchscreen mobile computing devices connectable to one or more cellular networks). UE 216 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. UE 216 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

UE 216 may be configured to connect or communicatively couple with (R)AN 206 through a radio interface 230, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, UE 216 and (R)AN 206 may use a Uu interface (e.g., an LTE-Uu interface) to exchange control plane data via a protocol stack comprising a PHY layer, a MAC layer, an RLC layer, a PDCP layer, and an RRC layer. A DL transmission may be from (R)AN 206 to the UE 216 and a UL transmission may be from UE 216 to (R)AN 206. UE 216 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

(R)AN 206 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). (R)AN 206 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as (R)AN 206) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 216 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

UPF 202 may act as an anchor point for intra-RAT and inter-RAT mobility, an external PDU session point of interconnect to DN 204, and a branching point to support multi-homed PDU session. UPF 202 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 202 may include an uplink classifier to support routing traffic flows to a data network. DN 204 may represent various network operator services, Internet access, or third party services. DN 204 may include, for example, an application server.

Figure 3:
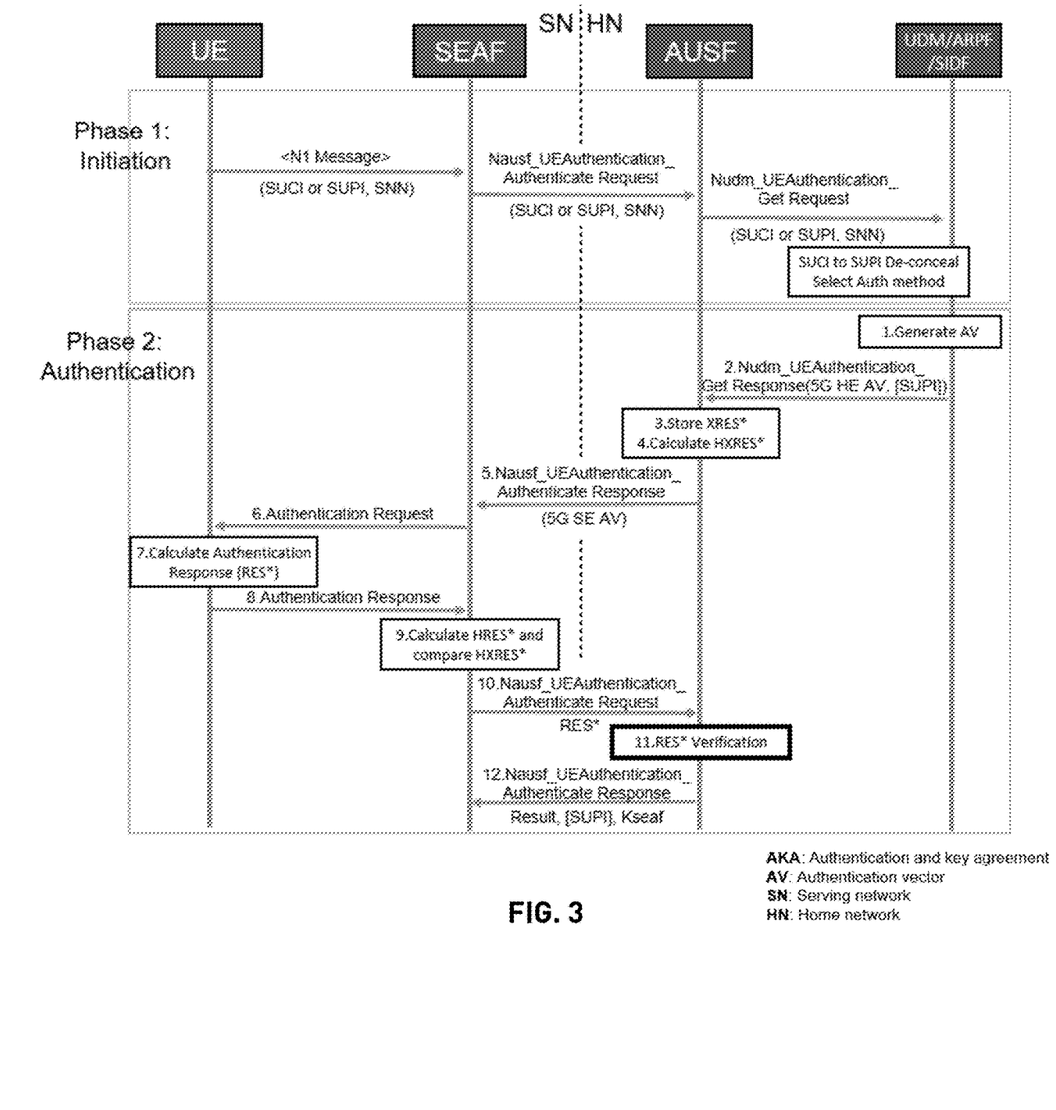
FIG. 3 is a message flow diagram showing a primary authentication procedure (5G AKA).

FIG. 3 shows a 5G-AKA primary authentication procedure. There are two phases in 5G AKA/EAP-AKA': initiation procedure and authentication procedure.

In the initiation procedure, a UE sends identification to SEAF in VPLMN. SEAF sends the authentication request to AUSF in HPLMN. The AUSF provides an authorization request to the UDM/ARPF/SIDF.

The authentication procedure entails authentication vector generation, in which the AV includes the RAND, authentication token (AUTN), expected response (XRES*), and $K_{AUSF}$. The $K_{AUSF}$ may be securely stored in the AUSF based on the home operator's policy on using such key. The AUSF derives the $K_{SEAF}$ (anchor key) from $K_{AUSF}$ and sends the challenge message to the SEAF. At receipt of the RAND and AUTN, the universal subscriber identity module (USIM) computes a response RES and returns RES, CK, IK to the UE. The mobile equipment (ME) compute RES* from RES and sends it back. The SEAF computes HRES* from RES* and compares HRES* with HXRES*. If successful, it forwards RES* to the AUSF. The AUSF compares the received RES* with the stored XRES*, if succeed, the authentication is successful and AUSF indicate to SEAF.

A UE generates $K_{AUSF}$ by itself. If the UE is a genuine UE, then it is able to generate the correct $K_{AUSE}$, which is same with the one generated by the network (UDM/ARPF). Details on $K_{AUSF}$ generation are available in 3GPP TS 33.501, clause 6.1.3.2.0, in which the UE generates the $K_{AUSF}$ after receiving necessary parameters from the network.

Figure 4:
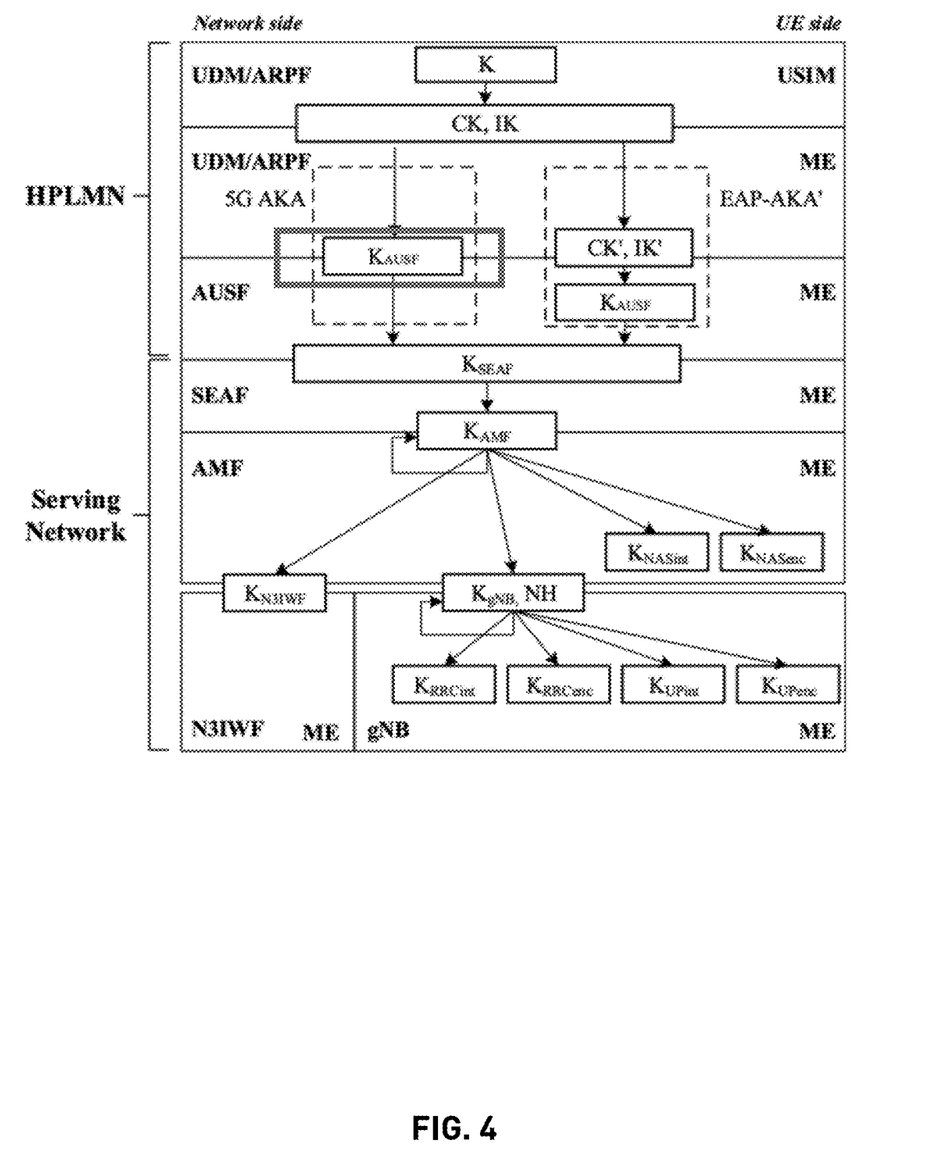
FIG. 4 is a block diagram showing a key hierarchy in 5G.

FIG. 4 shows a key hierarchy in 5G. $K_{AUSF}$ is common between UE and AUSF in the home network and is the basis of the subsequent key hierarchy. $K_{AUSF}$ is not delivered, but generated separately by a UE and network. Since a UE and the network have the same root key, they generate the same $K_{AUSF}$. The parameters needed for calculating the $K_{AUSF}$ are delivered from the network to the UE.

Figure 5:
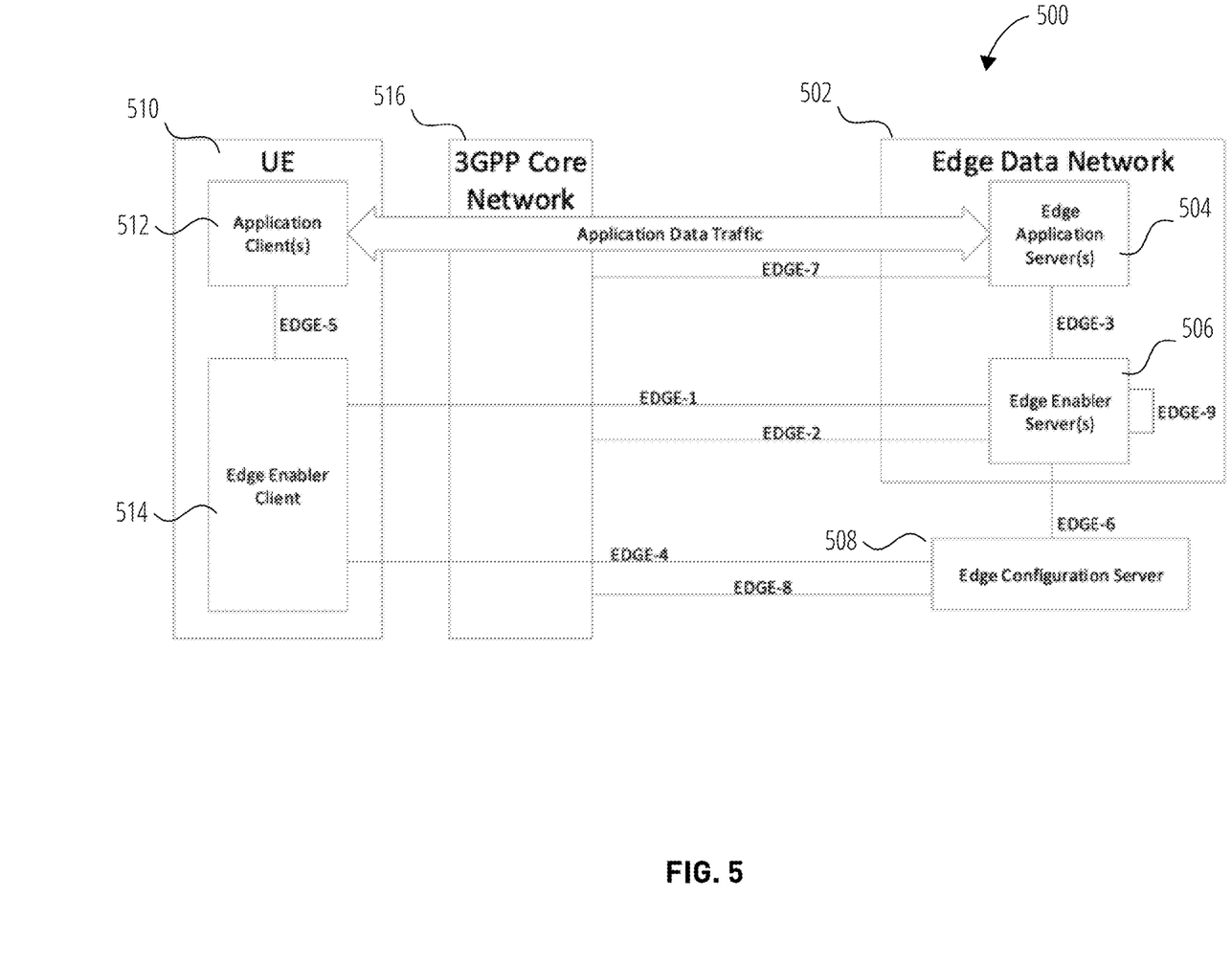
FIG. 5 is a block diagram showing an architecture for enabling edge applications.

FIG. 5 shows an architecture 500 for enabling edge applications, as described in 3GPP TS 23.558. An edge data network (EDN), EDN 502, is a local data network. Edge application server(s) (EAS), EAS 504, and edge enabler server(s), EES 506, are contained within EDN 502. An edge configuration server (ECS), ECS 508, provides configurations related to EES 506, including details of EDN 502 hosting EES 506. A UE 510 contains application client(s) 512 and an edge enabler client (EEC), EEC 514. EAS 504, EES 506, and ECS 508 may interact with a 3GPP core network 516.

ECS 508 provides supporting functions needed for EEC 514 to connect with EES 506. Functionalities of ECS 508 include provisioning of edge configuration information to EEC 514. The edge configuration information includes the following: information for EEC 514 to connect to EES 506, e.g., service area information applicable to local area data network (LADN); and information for establishing a connection with EES 506, such as a uniform resource identifier (URI).

EEC 514 provides supporting functions needed for application client(s). Functionalities of EEC 514 include the following: retrieval and provisioning of configuration information to enable the exchange of application data traffic with EAS 504; and discovery of EASes 504 available in EDN 502.

An EEC ID is a globally unique value that identifies EECs. One or more EEC(s) may be located in a UE.

SA6 3GPP TS 23.558 also sets forth the following specifications. The application layer architecture supports the use of either 3GPP credentials or application specific credentials or both for different deployment needs, for the communication between the UE and the functional entities providing the Edge Computing service. The application layer architecture supports mutual authentication and authorization check between clients and servers or servers and servers that interact. There is no such procedure in an SA6 specification yet. This disclosure proposes the authentication and authorization method between EEC 514 and ECS 508.

Figure 6:
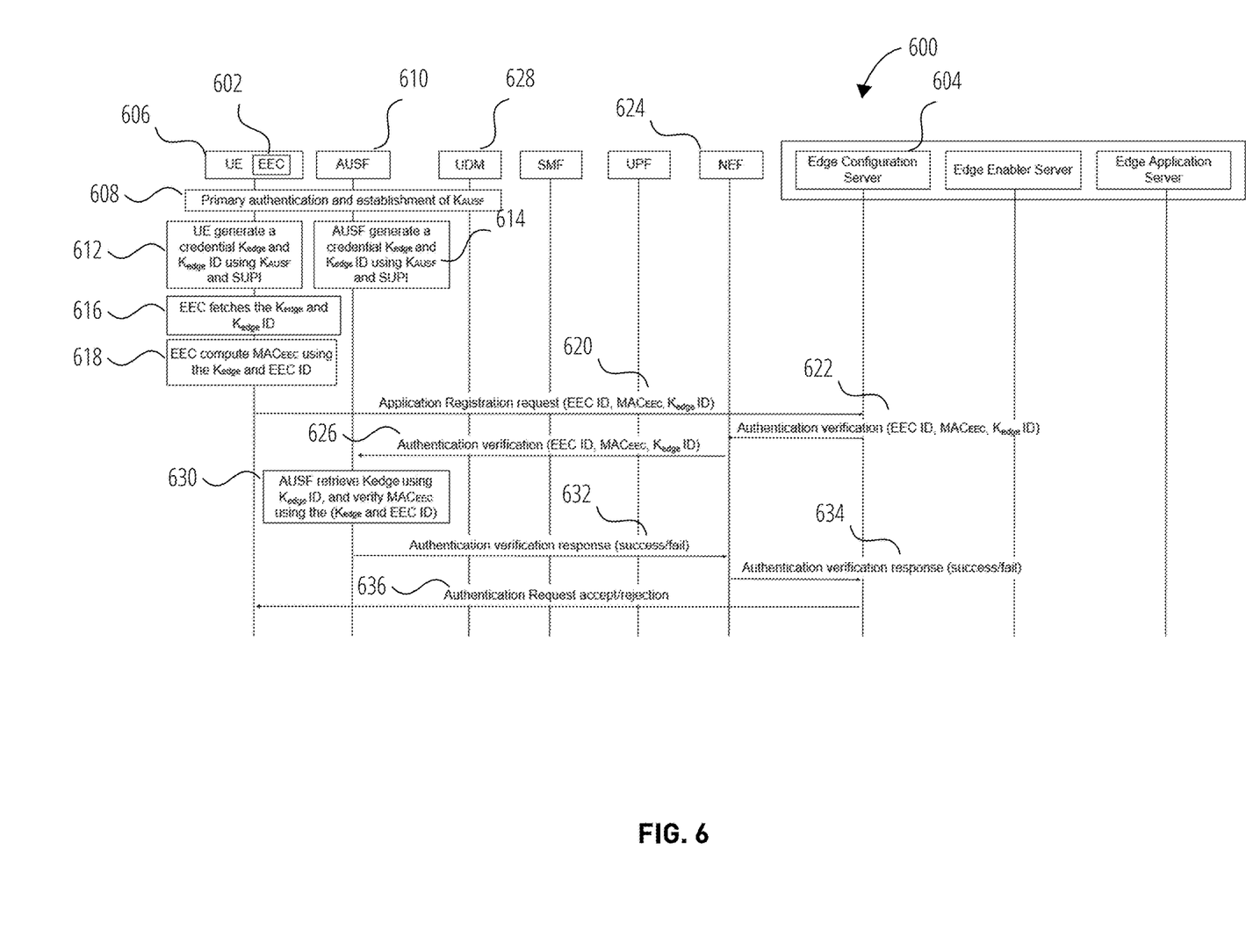
FIG. 6 is a message sequence diagram showing a call flow.

Authentication and authorization between EEC and ECS are raised as an issue in 3GPP TR 33.839. FIG. 6 shows a SA3 call flow authentication and authorization 600 between an EEC 602 and an ECS 604. Skilled persons will appreciate that similar functionality could be performed between EEC 602 and an EES, but only ECS 604 (not the EES) is described below for conciseness.

Initially, UE 606 performs primary authentication 608 with the network. Then, $K_{AUSF}$ is shared between UE 606 and an AUSF 610 in home network.

UE 606 generates 612 a credential $K_{edge}$ and $K_{edge}$ ID using $K_{AUSF}$ and SUPI, and $K_{edge}$ and $K_{edge}$ ID are stored securely. Generation of $K_{edge}$ and $K_{edge}$ ID are discussed below.

AUSF 610 generates 614 a credential $K_{edge}$ and $K_{edge}$ ID using $K_{AUSF}$ and SUPI, and $K_{edge}$ and $K_{edge}$ ID are stored securely stored securely.

EEC 602 fetches 616 the $K_{edge}$ and $K_{edge}$ ID. Accordingly, UE 606 provides a secure interface to transmit $K_{edge}$ and $K_{edge}$ ID.

EEC 602 computes 618 $MEC_{EEC}$ using the $K_{edge}$ and EEC ID. $MEC_{EEC}$ is calculated using SHA256 with the input $K_{edge}$ and EEC ID.

UE 606 sends 620 an application registration request (EEC ID, $MEC_{EEC}$, $K_{edge}$ ID) to ECS 604. Whether this message is sent using NAS or user plane is optional.

ECS 604 sends 622 an authentication verification (EEC ID, $MEC_{EEC}$, $K_{edge}$ ID) to NEF 624 for verification.

NEF 624 sends 626 an authentication verification (EEC ID, $MEC_{EEC}$, $K_{edge}$ ID) to UDM 628 for $MEC_{EEC}$ verification.

AUSF 610 retrieves 630 $K_{edge}$ using $K_{edge}$ ID, and verifies $MEC_{EEC}$ using the $K_{edge}$ and EEC ID.

If AUSF 610 verification is successful, then AUSF 610 sends 632 an authentication verification response (success) back to NEF 624, otherwise, AUSF 610 sends an authentication verification response (fail) to NEF 624.

NEF 624 sends 634 an authentication verification response (success/fail) from UDM 628 to ECS 604.

Based on the verification results, ECS 604 decides whether to accept or reject the authentication request, and sends 636 to EEC 602 in UE 606 an authentication request accept/rejection.

$K_{edge}$ is generated using the key derivation function (KDF) defined in Annex B of 3GPP TS 33.220(V17.0.0), and the Annex B is incorporated herein by reference. When deriving a $K_{edge}$ from $K_{AUSF}$, the following parameters shall be used to form the input string S to the KDF: FC=xxxx, which is allocated by 3GPP specifications (B 2.2 in TS 33.220 Annex B); P0=<SUPI>; L0=length of <SUPI>. The input key, KEY, shall be $K_{AUSF}$. $K_{edge}$ ID is generated by AUSF, and uniquely identifies one $K_{edge}$. The new number for MEC needs to be newly allocated by 3GPP, and TS 33.220 B2.2 should be revised accordingly.

Figure 7:
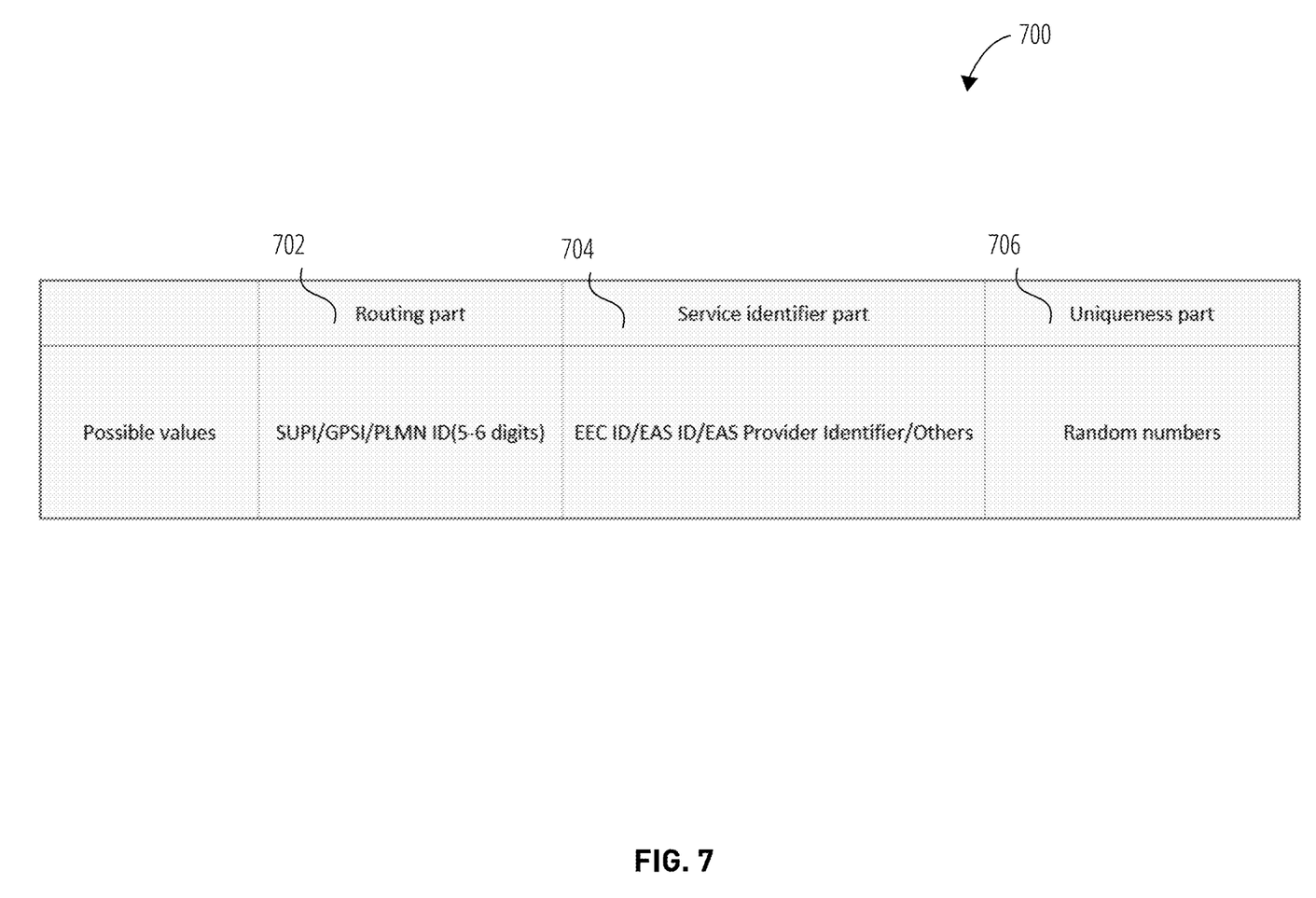
FIG. 7 is table showing data in a $K_{edge}$ ID.

FIG. 7 is a table 700 showing an example of information in $K_{edge}$ ID. Initially, however, it is noted that $K_{edge}$ ID is irrelevant with specific authentication method, in many authentication solutions in SA3, the $K_{edge}$ ID is use. In other words, $K_{edge}$ ID may be used in other authentication methods. In some embodiments, $K_{edge}$ ID is deployed as follows: (1) $K_{edge}$ ID is able to uniquely identify one $K_{edge}$. A UE may support multiple edge services, so it may have multiple $K_{edge}$ and $K_{edge}$ ID. (2) In an authentication procedure, an ECS may coordinate with an AUSF for authentication of whether the UE passed the primary authentication, and then the ECS is able to route to the correct AUSF with the $K_{edge}$ ID. There may be other methods to find the right AUSF, using $K_{edge}$ ID is one of them, which does not need to add other IEs in UE's registration request to ECS. (3) With just the $K_{edge}$ ID, an attacker cannot infer or calculate the $K_{edge}$.

FIG. 7 shows that $K_{edge}$ ID may include routing, service identifier, and uniqueness parts. Each part is explained below. (The "/" in the figure indicates an "or," meaning that some or all of the following elements can be adopted in various embodiments.)

A routing part 702 is intended for finding out the correct AUSF or NEF. Routing part 702 is based on one or more of the SUPI, generic public subscription identifier (GPSI), and public land mobile network (PLMN) ID.

A service identifier part 704 is intended for identifying the edge service. Service identifier part 704 is based on one or more of the EEC ID, EAS ID, and EAS provider identifier.

A uniqueness part 706 is intended for ensuring the $K_{edge}$ ID will not be conflict when the routing part and the service identifier part is the same. The random number can be generated by pseudorandom number generator (PRNG).

The order of the three parts shown in FIG. 7 may be different, in other embodiments. The length of the $K_{edge}$ ID need not be strictly limited, since it is a function of the length of the EEC ID/EAS ID/EAS provider ID, which may change.

Figure 8:
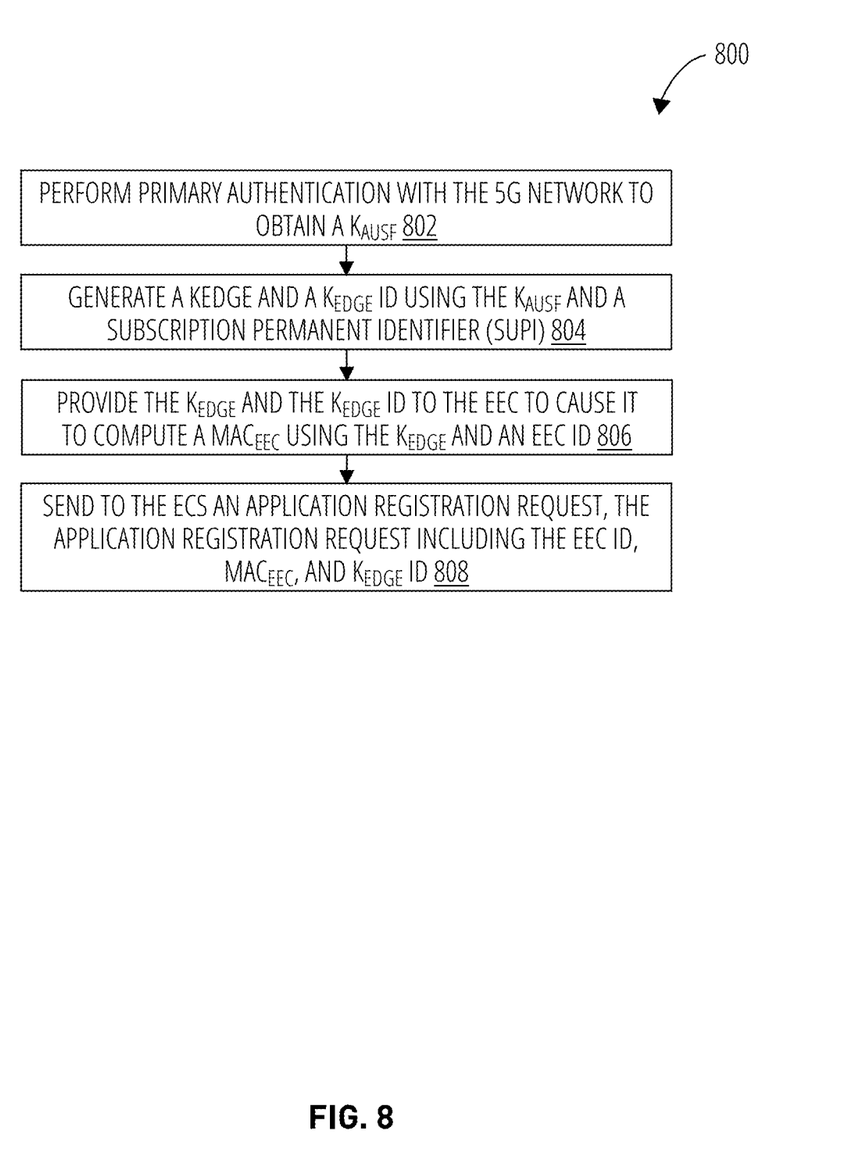
FIG. 8 is a flow diagram in accordance with one embodiment.

FIG. 8 shows a routine 800, performed by a UE configured to communicate in a 5G network, of authentication and authorization between an EEC of the UE and an ECS. In block 802, routine 800 performs primary authentication with the 5G network to obtain a $K_{AUSF}$. In block 804, routine 800 generates a $K_{edge}$ and a $K_{edge}$ ID using the $K_{AUSF}$ and a SUPI. In block 806, routine 800 provides the $K_{edge}$ and the $K_{edge}$ ID to the EEC to cause it to compute a $MEC_{EEC}$ using the $K_{edge}$ and an EEC ID. In block 808, routine 800 sends to the ECS an application registration request, the application registration request including the EEC ID, $MEC_{EEC}$, and $K_{edge}$ ID.

Routine 800 may optionally include sending a non-access stratum (NAS) or user-plane message including the application registration request.

Routine 800 may optionally include receiving from the ECS an authentication request acceptance or rejection.

Routine 800 may optionally include generating $K_{edge}$ according to a key derivation function (KDF) in which an input string S to the KDF includes FC, P0, and L0 parameters, the FC parameter being predetermined (e.g., allocated according to 3GPP specifications in Annex B), the P0 parameter is equal to the SUPI, and L0 is equal to a length of the SUPI.

Routine 800 may optionally include the $K_{edge}$ ID uniquely identifying one $K_{edge}$.

Routine 800 may optionally include the $K_{edge}$ ID having a routing part for locating an AUSF or a NEF. Routine 800 may optionally include the routing part based on one or more of the SUPI, GPSI, and PLMN ID.

Routine 800 may optionally include the $K_{edge}$ ID having a service identifier part for identifying an edge service. Routine 800 may optionally include the service identifier part based on one or more of the EEC ID, EAS ID, and EAS provider identifier.

Routine 800 may optionally include the $K_{edge}$ ID having a uniqueness part to ensure the $K_{edge}$ ID will not be conflict with another $K_{edge}$ ID. In one embodiment, the $K_{edge}$ ID is a pseudorandom number.

Figure 9:
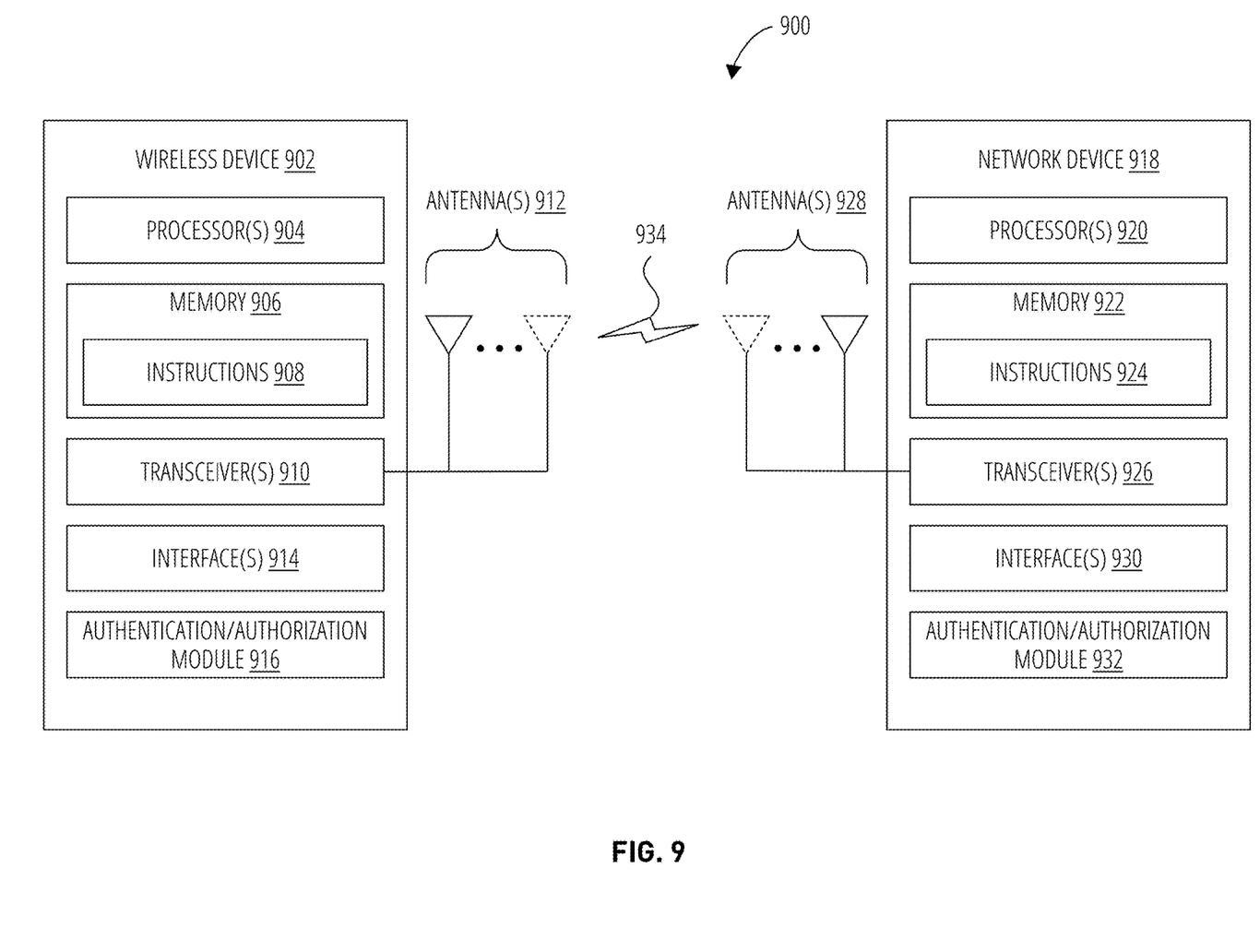
FIG. 9 illustrates a system for performing signaling between a wireless device and a network device, according to embodiments disclosed herein.

FIG. 9 illustrates a system 900 for performing signaling 934 between a wireless device 902 and a network device 918, according to embodiments disclosed herein. System 900 may be a portion of a wireless communications system as herein described. Wireless device 902 may be, for example, a UE of a wireless communication system. Network device 918 may be, for example, a base station (e.g., an eNB or a gNB) of a wireless communication system.

Wireless device 902 may include one or more processor(s) 904. Processor(s) 904 may execute instructions such that various operations of wireless device 902 are performed, as described herein. Processor(s) 904 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

Wireless device 902 may include a memory 906. Memory 906 may be a non-transitory computer-readable storage medium that stores instructions 908 (which may include, for example, the instructions being executed by processor(s) 904). Instructions 908 may also be referred to as program code or a computer program. Memory 906 may also store data used by, and results computed by, processor(s) 904.

Wireless device 902 may include one or more transceiver(s) 910 that may include radio frequency (RF) transmitter and/or receiver circuitry that use antenna(s) 912 of wireless device 902 to facilitate signaling (e.g., signaling 934) to and/or from wireless device 902 with other devices (e.g., network device 918) according to corresponding RATs.

Wireless device 902 may include one or more antenna(s) 912 (e.g., one, two, four, or more). For embodiments with multiple antenna(s) 912, wireless device 902 may leverage the spatial diversity of such multiple antenna(s) 912 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by wireless device 902 may be accomplished according to precoding (or digital beamforming) that is applied at wireless device 902 that multiplexes the data streams across antenna(s) 912 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, wireless device 902 may implement analog beamforming techniques, whereby phases of the signals sent by antenna(s) 912 are relatively adjusted such that the (joint) transmission of antenna(s) 912 can be directed (this is sometimes referred to as beam steering).

Wireless device 902 may include one or more interface(s) 914. Interface(s) 914 may be used to provide input to or output from wireless device 902. For example, a wireless device 902 that is a UE may include interface(s) 914 such as microphones, speakers, a touchscreen, buttons, and the like in order to allow for input and/or output to the UE by a user of the UE. Other interfaces of such a UE may be made up of made up of transmitters, receivers, and other circuitry (e.g., other than transceiver(s) 910/antenna(s) 912 already described) that allow for communication between the UE and other devices and may operate according to known protocols (e.g., Wi-Fi®, Bluetooth®, and the like).

Wireless device 902 may include an authentication/authorization module 916. Authentication/authorization module 916 may be implemented via hardware, software, or combinations thereof. For example, authentication/authorization module 916 may be implemented as a processor, circuit, and/or instructions 908 stored in memory 906 and executed by processor(s) 904. In some examples, authentication/authorization module 916 may be integrated within processor(s) 904 and/or transceiver(s) 910. For example, authentication/authorization module 916 may be implemented by a combination of software components (e.g., executed by a DSP or a general processor) and hardware components (e.g., logic gates and circuitry) within processor(s) 904 or transceiver(s) 910.

Authentication/authorization module 916 may be used for various aspects of the present disclosure, for example, aspects of FIGS. 2-8. For example, authentication/authorization module 916 is configured to perform the KDF or routine 800.

Network device 918 may include one or more processor(s) 920. Processor(s) 920 may execute instructions such that various operations of network device 918 are performed, as described herein. Processor(s) 904 may include one or more baseband processors implemented using, for example, a CPU, a DSP, an ASIC, a controller, an FPGA device, another hardware device, a firmware device, or any combination thereof configured to perform the operations described herein.

Network device 918 may include a memory 922. Memory 922 may be a non-transitory computer-readable storage medium that stores instructions 924 (which may include, for example, the instructions being executed by processor(s) 920). Instructions 924 may also be referred to as program code or a computer program. Memory 922 may also store data used by, and results computed by, processor(s) 920.

Network device 918 may include one or more transceiver(s) 926 that may include RF transmitter and/or receiver circuitry that use antenna(s) 928 of network device 918 to facilitate signaling (e.g., signaling 934) to and/or from network device 918 with other devices (e.g., wireless device 902) according to corresponding RATs.

Network device 918 may include one or more antenna(s) 928 (e.g., one, two, four, or more). In embodiments having multiple antenna(s) 928, network device 918 may perform MIMO, digital beamforming, analog beamforming, beam steering, etc., as has been described.

Network device 918 may include one or more interface(s) 930. Interface(s) 930 may be used to provide input to or output from network device 918. For example, a network device 918 that is a base station may include interface(s) 930 made up of transmitters, receivers, and other circuitry (e.g., other than transceiver(s) 926/antenna(s) 928 already described) that enables the base station to communicate with other equipment in a core network, and/or that enables the base station to communicate with external networks, computers, databases, and the like for purposes of operations, administration, and maintenance of the base station or other equipment operably connected thereto.

Network device 918 may include an authentication/authorization module 932. Authentication/authorization module 932 may be implemented via hardware, software, or combinations thereof. For example, authentication/authorization module 932 may be implemented as a processor, circuit, and/or instructions 924 stored in memory 922 and executed by processor(s) 920. In some examples, authentication/authorization module 932 may be integrated within processor(s) 920 and/or transceiver(s) 926. For example, authentication/authorization module 932 may be implemented by a combination of software components (e.g., executed by a DSP or a general processor) and hardware components (e.g., logic gates and circuitry) within processor(s) 920 or transceiver(s) 926.

Authentication/authorization module 932 may be used for various aspects of the present disclosure, for example, aspects of FIGS. 2-8. For example, authentication/authorization module 932 is configured to perform aspects of SEAF, AUSF, UDM, or NEF shown in FIGS. 2 and 6.

The following examples pertain to further embodiments.

Example 1 may include an apparatus comprising means to perform one or more elements of a method described in or related to any of the methods or processes described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6 may include a signal as described in or related to any of the above Examples, or portions or parts thereof.

Example 7 may include a datagram, packet, frame, segment, protocol data unit (PDU), or message as described in or related to any of the above Examples, or portions or parts thereof, or otherwise described in the present disclosure.

Example 8 may include a signal encoded with data as described in or related to any of the above Examples, or portions or parts thereof, or otherwise described in the present disclosure.

Example 9 may include a signal encoded with a datagram, packet, frame, segment, PDU, or message as described in or related to any of the above Examples, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11 may include a computer program comprising instructions, wherein execution of the program by a processing element is to cause the processing element to carry out the method, techniques, or process as described in or related to any of the above Examples, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, and/or methods described herein. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a user equipment (UE) configured to communicate in a 5G network, of authentication and authorization between an edge enabler client (EEC) of the UE and an edge configuration server (ECS), the method comprising:
performing primary authentication with the 5G network to obtain a $K_{AUSF}$;
generating a $K_{edge}$ and a $K_{edge}$ identifier (ID) using the $K_{AUSF}$ and a subscription permanent identifier (SUPI);
providing the $K_{edge}$ and the $K_{edge}$ ID to the EEC to cause it to compute a $MAC_{EEC}$ using the $K_{edge}$ and an EEC ID; and
sending to the ECS an application registration request, the application registration request including the EEC ID, the $MAC_{EEC}$, and the $K_{edge}$ ID, in which the sending comprises either sending a non-access stratum (NAS) message or a user-plane message.

2. The method of claim 1, further comprising receiving from the ECS an authentication request acceptance or rejection.

3. The method of claim 1, further comprising generating the $K_{edge}$ according to a key derivation function (KDF) in which an input string S to the KDF includes an FC parameter, a P0 parameter, and an L0 parameter, the FC parameter being allocated according to 3GPP specifications, the P0 parameter is equal to the SUPI, and the L0 parameter is equal to a length of the SUPI.

4. The method of claim 1, in which the $K_{edge}$ ID uniquely identifies one $K_{edge}$.

5. The method of claim 1, in which the $K_{edge}$ ID includes a routing part for locating an authentication server function (AUSF) or a network exposure function (NEF).

6. The method of claim 5, in which the routing part is based on one or more of the SUPI, generic public subscription identifier (GPSI), and public land mobile network (PLMN) ID.

7. The method of claim 1, in which the $K_{edge}$ ID includes a service identifier part for identifying an edge service.

8. The method of claim 7, in which the service identifier part is based on one or more of the EEC ID, an edge application server (EAS) ID, and an EAS provider identifier.

9. The method of claim 1, in which the $K_{edge}$ ID includes a uniqueness part to ensure the $K_{edge}$ ID will not be conflict with another $K_{edge}$ ID.

10. The method of claim 9, in which the uniqueness part is a pseudorandom number.

11. A non-transitory computer-readable storage medium for a user equipment (UE) configured to communicate in a 5G network and perform authentication and authorization between an edge enabler client (EEC) of the UE and an edge configuration server (ECS), the computer-readable storage medium including instructions that when executed by the UE, cause the UE to:
perform primary authentication with the 5G network to obtain a $K_{AUSF}$;
generate a $K_{edge}$ and a $K_{edge}$ identifier (ID) using the $K_{AUSF}$ and a subscription permanent identifier (SUPI);
provide the $K_{edge}$ and the $K_{edge}$ ID to the EEC to cause it to compute a $MAC_{EEC}$ using the $K_{edge}$ and an EEC ID; and
send to the ECS an application registration request in a non-access stratum (NAS) message or a user-plane message, the application registration request including the EEC ID, the $MAC_{EEC}$, and the $K_{edge}$ ID.

12. The computer-readable storage medium of claim 11, in which the instructions further configure the UE to receive from the ECS an authentication request acceptance or rejection.

13. The computer-readable storage medium of claim 11, in which the instructions further configure the UE to generate the $K_{edge}$ according to a key derivation function (KDF) in which an input string S to the KDF includes an FC parameter, a P0 parameter, and an L0 parameter, the FC parameter being allocated according to 3GPP specifications, the P0 parameter is equal to the SUPI, and the L0 parameter is equal to a length of the SUPI.

14. The computer-readable storage medium of claim 11, in which the $K_{edge}$ ID uniquely identifies one $K_{edge}$.

15. The computer-readable storage medium of claim 11, in which the $K_{edge}$ ID includes a routing part for locating an authentication server function (AUSF) or a network exposure function (NEF).

16. The computer-readable storage medium of claim 15, in which the routing part is based on one or more of the SUPI, generic public subscription identifier (GPSI), and public land mobile network (PLMN) ID.

* * * * *